(12) United States Patent
Guillaume et al.

(10) Patent No.: US 9,016,351 B2
(45) Date of Patent: Apr. 28, 2015

(54) PREHEATING DEVICE FOR A FLUID/FLUID HEAT EXCHANGER OF AN AIRCRAFT

(75) Inventors: Pierre Guillaume, Toulouse (FR); Patrick Lair, Lasserre (FR)

(73) Assignees: Airbus Operations, Toulouse (FR); Airbus, Blagnac (FR)

(*) Notice: Subject to any disclaimer, the term of this patent is extended or adjusted under 35 U.S.C. 154(b) by 757 days.

(21) Appl. No.: 13/150,439

(22) Filed: Jun. 1, 2011

(65) Prior Publication Data
US 2011/0297352 A1   Dec. 8, 2011

(30) Foreign Application Priority Data
Jun. 4, 2010   (FR) ..................................... 10 54392

(51) Int. Cl.
| F28D 1/04 | (2006.01) |
| F28F 13/00 | (2006.01) |
| F02C 7/224 | (2006.01) |
| F28D 7/16 | (2006.01) |
| F28F 19/00 | (2006.01) |
| F28F 17/00 | (2006.01) |
| B64D 33/00 | (2006.01) |
| F28D 21/00 | (2006.01) |

(52) U.S. Cl.
CPC ................. *F02C 7/224* (2013.01); *B64D 33/00* (2013.01); *F28D 7/16* (2013.01); *F28D 7/1623* (2013.01); *F28D 2021/0021* (2013.01); *F28D 2021/0089* (2013.01); *F28F 19/006* (2013.01)

(58) Field of Classification Search
CPC ........ F02C 7/224; B64D 33/00; F28F 19/006; F28D 7/1623; F28D 7/16; F28D 2021/0089; F28D 2021/0021; F28D 1/0461
USPC ............... 165/41–43, 51, 52, 104.13, 104.14, 165/104.19, 119, 146, 148, 150, 157, 158
See application file for complete search history.

(56) References Cited

U.S. PATENT DOCUMENTS

| 952,102 | A | * | 3/1910 | Curtis ........................... 165/146 |
| 1,627,265 | A | * | 5/1927 | Bancel .......................... 165/146 |
| 2,006,649 | A | * | 7/1935 | Modine ......................... 165/146 |
| 2,055,549 | A | * | 9/1936 | Modine ......................... 165/146 |
| 3,307,623 | A | * | 3/1967 | Machold et al. .............. 165/169 |

(Continued)

FOREIGN PATENT DOCUMENTS

| EP | 1061243 | 12/2000 |
| FR | 2318314 | 2/1977 |
| FR | 2936224 | 3/2010 |

OTHER PUBLICATIONS

French Search Report dated Feb. 4, 2011, in a corresponding French Application.

*Primary Examiner* — Tho V Duong
*Assistant Examiner* — Aaron Isenstadt
(74) *Attorney, Agent, or Firm* — Young & Thompson

(57) ABSTRACT

An aircraft includes a heat exchanger between a first fluid that flows into the narrow pipes of the exchanger and that is able to contain solid elements that can melt, and, a second fluid to be cooled. The heat exchanger includes a device for preheating the first fluid upstream from the pipes of the exchanger, a number of pipes arranged in at least one plane that intersects the direction of flow of the first fluid, whereby the spacing between two adjacent pipes is suitable for retaining the solid elements of large dimensions and for allowing them to pass only when they have melted at least partially.

16 Claims, 3 Drawing Sheets

(56) References Cited

U.S. PATENT DOCUMENTS

Figure 3:
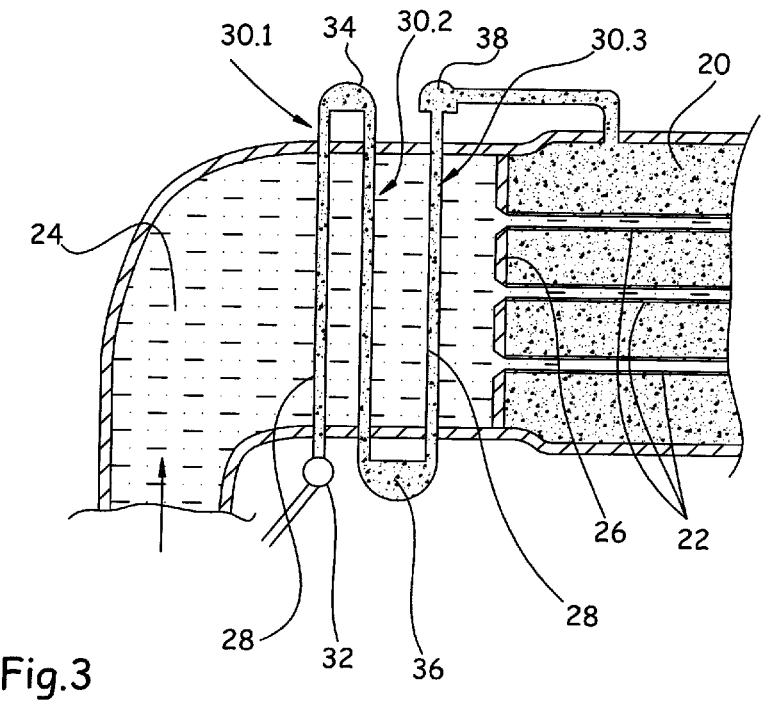

| | | | |
|---|---|---|---|
| 4,020,632 A | * | 5/1977 | Coffinberry et al. ............ 60/773 |
| 4,151,710 A | | 5/1979 | Griffin et al. |
| 4,462,547 A | * | 7/1984 | Metz ............................ 239/130 |
| 4,773,212 A | | 9/1988 | Griffin et al. |
| 5,435,155 A | | 7/1995 | Paradis |
| 2002/0162651 A1 | * | 11/2002 | Nakagome et al. ............ 165/158 |
| 2010/0051252 A1 | * | 3/2010 | Ninagawa et al. ............ 165/175 |

* cited by examiner

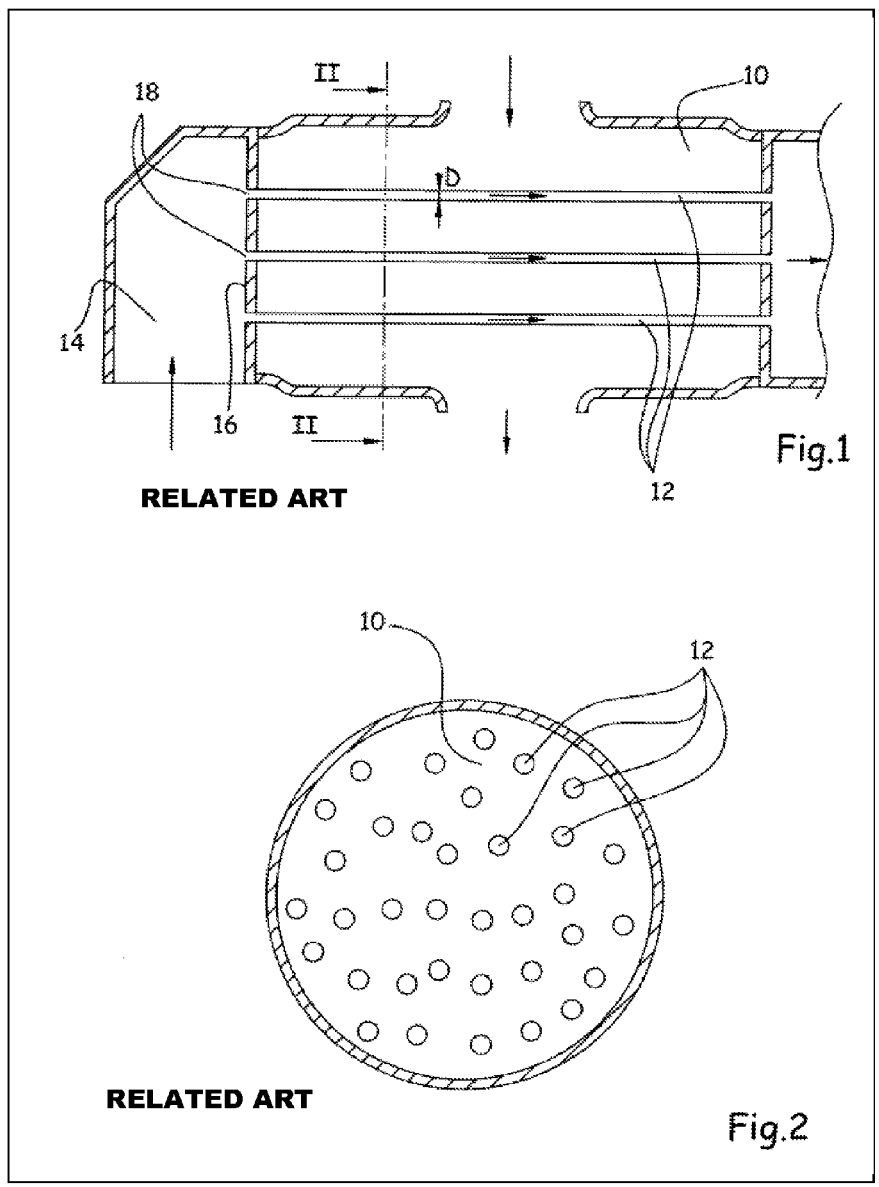

PREHEATING DEVICE FOR A FLUID/FLUID HEAT EXCHANGER OF AN AIRCRAFT

BACKGROUND OF THE INVENTION

1. Field of the Invention

This invention relates to a preheating device for a fluid/fluid heat exchanger of an aircraft, more particularly for a fuel/oil exchanger of an aircraft power plant.

An aircraft comprises an airframe and at least one propulsion system. According to a widely used embodiment, a propulsion system is suspended under a wing by means of a mast. More generally, the propulsion system is connected to the airframe by means of a mast.

2. Description of the Related Art

A propulsion system comprises a gas turbine engine that is equipped with an engine cooling circuit, in which a coolant (or cool fluid), in particular oil, circulates.

The gas turbine engine is supplied with fuel by means of a fuel circuit that extends from a reservoir that is placed at the airframe.

In some cases, it is possible to use several cooling sources for cooling the oil of the gas turbine engine, and in particular a fuel/oil exchanger at the level of the engine cooling circuit, and to use the fuel as coolant so as to cool the oil of the gas turbine engine.

This arrangement is described in particular in the patent application FR-2,936,224, which proposes a process that uses the fuel as a coolant between the airframe and the propulsion system.

According to an embodiment that is illustrated in FIG. 1, an exchanger comprises at least one chamber 10 in which the oil circulates and a number of pipes 12 in which the fuel circulates and which pass through said chamber 10. In this case, the inside surface of the pipes 12 is in contact with the fuel whereas the outside surface of said pipes is in contact with the oil. These pipes are essentially rectilinear and have a constant diameter D. Upstream, this exchanger also comprises a fuel supply pipe 14 that can be connected to a duct, not shown.

The chamber 10 is separated from the pipe by a plate 16 that comprises a number of openings 18 with a cross-section that is constant and equal to D, and said openings each work with a pipe 12.

Under certain flight conditions, solid elements may appear in the form of ice crystals in the fuel that may have large dimensions preventing them from entering the pipes 12 via the openings 18. Thus, the surface of the plate 16 that is oriented toward the fuel supply pipe 14 is potentially a zone in which ice crystals can accumulate, and the ice crystals run the risk of limiting the flow of fuel in the direction of the power plant.

The document FR-2,318,314 provides a second exchanger for preheating the fuel so as to limit the accumulation of ice crystals in the first exchanger. However, the risks of ice crystals accumulating are transferred to the level of the second exchanger.

SUMMARY OF THE INVENTION

Also, the object of this invention is to eliminate the drawbacks of the prior art by proposing a device for a fuel/oil exchanger that makes it possible to limit the risks of blocking fuel drain pipes.

For this purpose, the invention has as its object an aircraft that comprises a heat exchanger between, on the one hand, a first fluid that flows into the narrow pipes of said exchanger and that is able to contain solid elements that can melt, and, on the other hand, a second fluid to be cooled, characterized in that it comprises a device for preheating the first fluid upstream from the pipes of the exchanger, comprising a number of pipes that are arranged in at least one plane intersecting the direction of flow of the first fluid, whereby the spacing between two adjacent pipes is suitable for retaining the solid elements of dimensions larger than the spacing between the two adjacent pipes, and for allowing them to pass only when they have melted at least partially.

BRIEF DESCRIPTION OF THE DRAWING FIGURES

Figure 4:
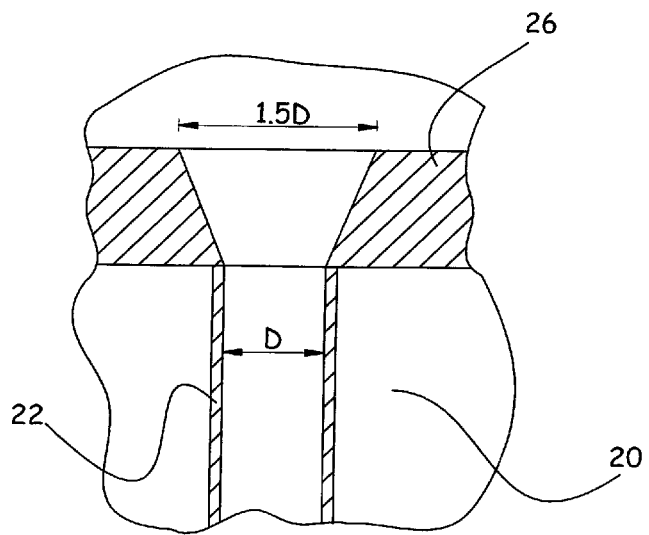
Figure 5:
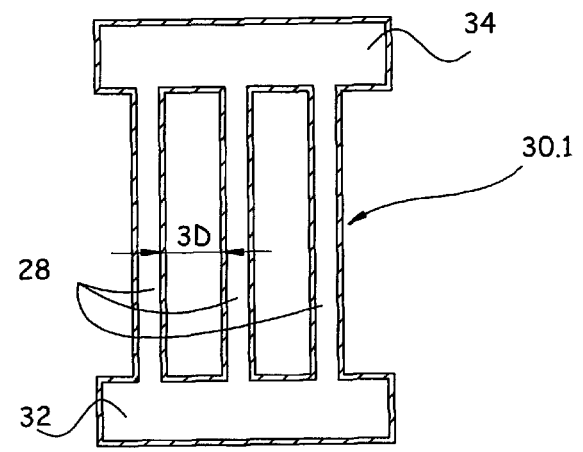
Figure 6:
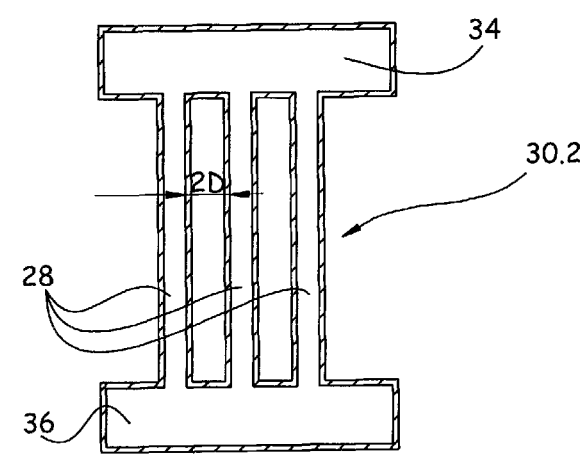
Figure 7:
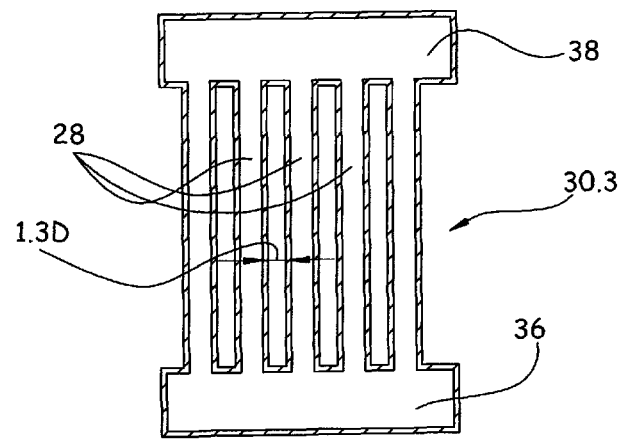

Other characteristics and advantages will emerge from the following description of the invention, a description that is provided only by way of example, relative to the accompanying drawings in which:

FIG. 1 is a diagram that illustrates a fuel/oil exchanger according to the prior art, FIG. 2 is a cutaway along line II-II of FIG. 1 of an exchanger, FIG. 3 is a diagram that illustrates the means for preheating fuel at the exchanger input according to the invention, FIG. 4 is a cutaway that illustrates the input cross-section of a pipe for the fuel of an exchanger according to the invention, and FIGS. 5 to 7 are diagrams of different stages of fuel preheating means according to the invention.

DETAILED DESCRIPTION OF THE INVENTION

FIG. 3 diagrammatically shows only a portion of a heat exchanger between two fluids, in particular between fuel and oil. The latter comprises a chamber 20 in which the oil flows and through which passes pipes 22 in which the fuel flows. To promote heat exchanges, the exchanger comprises a large number of narrow pipes.

According to one embodiment, the pipes have a circular cross-section with a diameter D.

This exchanger is more particularly designed for a power plant of an aircraft, whereby the fuel is designed for the power plant of the aircraft and the oil is designed to cool it. However, it is not limited to oil and to fuel and may be suitable for two fluids, one of the fluids circulating in the narrow pipes of an exchanger that can contain solid elements that can melt in the manner of ice crystals.

The inputs and outputs of oil and the output of fuel are not described in more detail because they are known to one skilled in the art and can be identical to those of the exchangers of the prior art.

Upstream, this exchanger comprises at least one fuel supply pipe 24 that divides into a number of pipes 22. According to one embodiment, the exchanger comprises a plate 26 that separates the supply pipe 24 and the chamber 20 that is designed for oil, whereby said plate comprises a number of openings that each work with a pipe 22. The connection between the plate 26 and the pipes 22 is not described in more detail because it can be carried out in the same way as according to the exchangers of the prior art.

According to the invention, the fuel circuit comprises a preheating device upstream from pipes 22 so as to limit the presence in the fuel of large solid elements that can melt and that run the risk of accumulating at the input or in the pipes 22 of the exchanger.

By way of example, the solid elements that can melt and that are present in the fuel can be ice crystals. However, the invention is not limited to this type of solid element that can melt.

Advantageously, the preheating device is arranged at the supply pipe 24 of the exchanger.

According to the invention, the preheating device comprises at least one so-called preheating circuit in which a coolant circulates whose temperature makes it possible to melt the ice crystals, whereby said circuit comprises at least one wall that separates the fuel to be reheated and said coolant.

According to the invention, in the supply pipe 24, a preheating circuit comprises a number of pipes 28 that are spaced in between and in which a coolant circulates. The pipes 48 can have different cross-sectional shapes. Thus, they can be circular, or they can be very thin.

Preferably, the coolant is the oil that is designed to pass through the exchanger. Thus, the hot oil that is cooled in the exchanger by the fuel is used to preheat the fuel upstream from the exchanger.

Preferably, the pipes 28 are rectilinear. Advantageously, the pipes 28 are arranged in a plane that intersect the direction of flow of the fuel in the supply pipe 24. As appropriate, the pipes can be arranged in the same plane or in several planes.

The spacing between two adjacent pipes is suitable for retaining large ice crystals and allows them to pass only when they have melted at least partially and when the risks that they accumulate in a detrimental manner upstream from the pipes 22 or in the latter are limited, in such a way as not to disturb the operation of the power plant of the aircraft.

Advantageously, the preheating circuit comprises at least two series of pipes 28, a first series 30.1 with pipes that are separated from one another by a distance D1, a second series 30.2 with pipes that are separated from one another by a distance D2, a third series 30.3 with pipes that are separated from one another by a distance D3, and so on.

The pipes of the same series are parallel to one another and are arranged in at least one plane that is essentially intersecting the direction of flow of the fuel in the supply pipe 24. The pipes of the same series can be arranged in the same plane intersecting the direction of flow of the fuel in the supply pipe 24 or in several planes.

According to another characteristic of the invention, the spacing between the pipes decreases from one series to the next in the direction of flow of the fuel. Thus, D1 is greater than D2, which is itself greater than D3, and so on. In this way, each series constitutes a screen that can retain the ice crystals, whereby the size of the retained ice crystals decreases as they come close to the pipes 22 of the exchanger.

This arrangement makes it possible to limit the risks of blockage even at the level of the series of pipes 28 that are provided for the preheating of the fuel.

Advantageously, the diameter D1 is less than or equal to approximately 3 D, and preferably greater than or equal to 2 D; the diameter D2 is less than or equal to approximately 2 D, and preferably greater than or equal to 1.3 D; and the diameter D3 is less than or equal to approximately 1.3 D, and preferably greater than or equal to D.

According to one embodiment, the pipes 28 of the first series 30.1 are supplied by a tank 32 that distributes the oil in all of the pipes 28 of the first series. Next, the pipes 28 of the first series 30.1 are connected to the pipes of the second series 30.2 by a collector/distributor 34, whereby the pipes 28 of the second series 30.2 are connected to the pipes 28 of the third series by a collector/distributor 36. Finally, the pipes of the last series, in this case those of the third series 30.3, empty into a collector 38 that is connected to the input of the oil in the exchanger.

According to another aspect of the invention, the ends of the pipes 22 of the exchanger or the openings of the plate 26 are tapered and flared in the direction of the supply pipe 24.

According to one embodiment, the widest cross-section of the pipes or the openings has a diameter on the order of 1.5 D.

According to another point of the invention, the distance between two adjacent pipes is less than or equal to 2.5 D, or spacing between the two widest cross-sections of two adjacent pipes is less than or equal to D.

These arrangements at the ends of the pipes of the exchanger or the plate of the exchanger contribute to limiting the risks of ice crystals accumulating.

The invention claimed is:

1. An aircraft that comprises:
   a liquid-liquid heat exchanger between a first liquid fluid which is fuel that flows into a plurality of first pipes (22) of said exchanger and that is able to contain ice crystals that can melt, and a second liquid heat exchange fluid to be cooled;
   the first liquid fluid being canalized in a supply pipe (24); and
   a preheating device configured for preheating the first fluid upstream from the plurality of first pipes (22) of the exchanger, the preheating device being arranged in the supply pipe (24), the preheating device comprising
      a plurality of second pipes (28) arranged in at least one plane that intersects a direction of flow of the first fluid, a spacing between two adjacent second pipes of the device for preheating being suitable for retaining the ice crystals having dimensions larger than the spacing and for allowing the ice crystals to pass only when the ice crystals have melted at least partially,
      at least two series of the plurality of second pipes (28), whereby the spacing between said plurality of second pipes (28) decreases from one series to the next in the direction of flow of the first fluid, and
      D being a diameter of the first pipes (22), the pipes of a last series of pipes of the pre-heating device are separated from one another by a distance greater than or at least equal to D.

2. The aircraft according to claim 1, wherein the preheating device is arranged at a level of a pipe (24) for supply of the first fluid of the exchanger.

3. The aircraft according to claim 1, wherein the preheating device further comprises:
   a first series (30.1) of the plurality of second pipes (28) with a spacing D1 between them that is less than or equal to approximately three times a diameter of the plurality first pipes (22) of the exchanger; and
   a second series (30.2) of the plurality of second pipes (28) with a spacing D2 between them that is less than or equal to two times the diameter of the plurality of first pipes (22) of the exchanger.

4. The aircraft according to claim 3, wherein the preheating circuit further comprises a third series (30.3) of the plurality of second pipes (28) with a spacing D3 between them that is less than or equal to approximately 1.3 times the diameter of the plurality of first pipes (22) of the exchanger.

5. The aircraft according to claim 1, wherein a plate (26) separates a chamber (10) that contains the second fluid and a pipe (24) for supply of the first fluid, and said plate comprises a plurality of openings that each work with a pipe (22) of the plurality of first pipes of the exchanger, wherein ends of the plurality of first pipes (22) of the exchanger or openings of the plate (26) are flared in a direction of the supply pipe (24).

6. The aircraft according to claim 5, wherein a widest cross-section of ends of the plurality of first pipes (22) of the exchanger or openings of the plate (26) has a diameter on the order of 1.5 times the diameter of the pipes of the exchanger.

7. The aircraft according to claim 1, wherein the second fluid is oil.

8. A liquid-liquid heat exchanger, comprising:
a plurality of first pipes, the plurality of first pipes being adapted to contain a first liquid fluid and meltable solid elements, the first liquid fluid being canalized in a supply pipe, and a second liquid heat exchange fluid to be cooled; and
a preheater upstream from the plurality of first pipes, the preheater being arranged in a supply pipe, the preheater comprising a plurality of second pipes arranged in a plane intersecting a direction of flow of the first fluid, and
and a spacing between two adjacent second pipes of the preheater is suitable for retaining the solid elements having dimensions larger than the spacing and for allowing the solid elements to pass only when the solid elements have melted at least partially, wherein
a preheating circuit comprises at least two series of the plurality of pipes, and the spacing between said plurality of pipes decreases from one series to the next in the direction of flow of the first fluid, and
D being a diameter of the first pipes, the pipes of a last series of pipes of the preheater are separated from one another by a distance greater than or at least equal to D.

9. The liquid-liquid heat exchanger according to claim 8, wherein the preheater is arranged at a level of a pipe for supply of the first fluid of the exchanger.

10. The liquid-liquid heat exchanger according to claim 8, wherein the preheating circuit further comprises:
a first series of pipes with a spacing D1 between them that is less than or equal to approximately three times a diameter of the pipes of the exchanger; and
a second series of pipes with a spacing D2 between them that is less than or equal to two times the diameter of the pipes of the exchanger.

11. The liquid-liquid heat exchanger according to claim 10, wherein the preheating circuit further comprises a third series of pipes with a spacing D3 between them that is less than or equal to approximately 1.3 times the diameter of the pipes of the exchanger.

12. The liquid-liquid heat exchanger according to claim 10, wherein a plate separates a chamber that contains the second fluid and a supply pipe of the first fluid, and said plate comprises a plurality of openings that each work with a pipe of the plurality of first pipes of the exchanger, wherein ends of the plurality of first pipes of the exchanger or openings of the plate are flared in a direction of the supply pipe.

13. The liquid-liquid heat exchanger according to claim 12, wherein a widest cross-section of the plurality of first pipes of the exchanger or openings of the plate has a diameter on the order of 1.5 times the diameter of the pipes of the exchanger.

14. The liquid-liquid heat exchanger according to claim 8, wherein the first fluid is fuel and the solid elements are ice crystals.

15. The liquid-liquid heat exchanger according to claim 8, wherein the second fluid is oil.

16. A liquid-liquid heat exchanger, comprising:
a plurality of first pipes, the plurality of first pipes being adapted to contain a liquid fuel and meltable ice crystals, and heat exchange oil to be cooled, the liquid fuel being canalized in a supply pipe; and
a preheater upstream from the plurality of first pipes, the preheater being arranged in the supply pipe, the preheater comprising a plurality of second pipes arranged in a plane intersecting a direction of flow of the liquid fuel, and
and a spacing between two adjacent second pipes of the preheater is suitable for retaining the ice crystals having dimensions larger than the spacing and for allowing the solid elements to pass only when the ice crystals have melted at least partially, wherein
a preheating circuit comprises:
a first series of the plurality of second pipes with a spacing D1 between them that is less than or equal to approximately three times a diameter of the plurality first pipes of the exchanger; and
a second series of the plurality of second pipes with a spacing D2 between them that is less than or equal to two times the diameter of the plurality of first pipes of the exchanger, and
D being a diameter of the first pipes, the pipes of a last series of pipes of the preheater are separated from one another by a distance greater than or at least equal to D.

* * * * *